United States Patent [19]

Chervitz

[11] Patent Number: 4,509,533

[45] Date of Patent: * Apr. 9, 1985

[54] FEVER THERMOMETER

[76] Inventor: Melvin Chervitz, E.Z. Temp, Inc., P.O. Box 27505, 12148 Lackland Rd., St. Louis, Mo. 63141

[*] Notice: The portion of the term of this patent subsequent to Nov. 11, 1997 has been disclaimed.

[21] Appl. No.: 420,099

[22] Filed: Sep. 20, 1982

Related U.S. Application Data

[63] Continuation of Ser. No. 173,164, Jul. 28, 1980, abandoned, which is a continuation-in-part of Ser. No. 924,507, Jul. 14, 1978, Pat. No. 4,232,684.

[51] Int. Cl.³ .............................................. A61B 10/00
[52] U.S. Cl. ..................................... 128/736; 374/162
[58] Field of Search ................. 128/736; 374/160–162

[56] References Cited

U.S. PATENT DOCUMENTS

| | | | |
|---|---|---|---|
| 3,661,142 | 5/1972 | Flam | 128/736 X |
| 3,893,340 | 7/1975 | Parker | 374/161 |
| 4,030,482 | 6/1977 | Navato | 128/736 X |
| 4,070,912 | 1/1978 | McNaughtan et al. | 128/736 X |
| 4,138,889 | 2/1979 | Fraschini | 374/160 |
| 4,156,365 | 5/1979 | Heinmets et al. | 374/162 |
| 4,198,861 | 4/1980 | Luk | 128/736 X |
| 4,232,684 | 11/1980 | Chervitz | 128/736 |

*Primary Examiner*—Lee S. Cohen
*Assistant Examiner*—Angela D. Sykes

*Attorney, Agent, or Firm*—Cohn, Powell & Hind

[57] ABSTRACT

A fever thermometer having an adhesive on one side of a flexible backing web for adhering the web to the skin of the human body, the web being provided with a background color, and having a plurality of numerical display areas on the opposite side of the web, each numerical display area including an encapsulated liquid crystal indicator, the color spectrum of each liquid crystal indicator being responsive to a different specific temperature range, and the liquid crystal indicators being initially of a color to complement the background color so as to be subtantially invisible at temperatures below the minimum threshold temperature of the indicator having the lowest temperature range. A directional indicator is provided on the opposite side of the web for enabling adherence of the web with the numerical display areas in a predetermined attitude when the numerical display areas are substantially invisible at temperatures below the minimum threshold temperature so that the numerical display areas can be easily read when made visible at temperatures within the responsive temperature ranges of the liquid crystal indicators. The numerical display areas having liquid crystal indicators that indicate a fever condition are located at one side of the directional indicator, and the numerical display areas having liquid crystal indicators that indicate a non-fever condition are located at the opposite side of the directional indicator.

3 Claims, 3 Drawing Figures

FEVER THERMOMETER

CROSS-REFERENCE TO RELATED APPLICATION

This application is a continuation of application Ser. No. 173,164, filed July 28, 1980, now abandoned, which is a continuation-in-part of co-pending application, Ser. No. 924,507, filed July 14, 1978, entitled "Fever Thermometer", now U.S. Pat. No. 4,232,684 issued Nov. 11, 1980.

BACKGROUND OF THE INVENTION

This invention relates generally to a fever thermometer, and more particularly to a thermometer that may be adhesively applied to the skin of the human body and which indicates the body temperature.

References made to U.S. Pat. Nos. 3,661,142 and 4,030,482 for disclosure of thermometers in the same general art as this invention in which the thermometers utilize layers of encapsulated liquid crystals that change color in response to changes in temperature within a predetermined temperature range to indicate the skin temperature of the body. As is conventional, these thermometers use a flexible backing web of plastic film or the like with a pressure-sensitive adhesive applied thereto so that the thermometer may be readily adhered to the skin.

In those fever thermometers of the type disclosed in U.S. Pat. No. 4,030,482, the liquid crystal indicators are initially of a color to complement the background color applied to the flexible backing web so that the numerical display areas are substantially invisible at temperatures below a minimum threshold temperature of the indicator having the lowest temperature range. As a result, when such fever thermometer is applied to the skin under usual ambient temperatures, the attitude of the numerical display areas is not known or is not readily discernable. Accordingly, the thermometer may be adhesively applied with the attitude of the numerical display areas such that they can not be easily read when they are made visible at temperatures within the responsive temperature ranges of the liquid crystal indicators. In such event, the thermometer may have to be removed and reapplied until the desired attitude is achieved.

Moreover, in these prior fever thermometers discussed above, one has to be able to read and/or understand the numerical display areas in order to ascertain whether or not a fever condition exists. This requirement precludes use of the particular fever thermometer by one who cannot read and/or understand the numerical display areas as a result of an educational deficiency or of impaired vision.

SUMMARY OF THE INVENTION.

The present fever thermometer includes a directional indicator for enabling adherence of the web with the numerical display areas in a predetermined attitude when the numerical display areas are substantially invisible at temperatures below the minimum threshold temperature of the indicator having the lowest temperature range so that the numerical display areas can be easily read when made visible at temperatures within the responsive temperature ranges of the liquid crystal indicators.

Moreover, the present fever thermometer enables one who cannot read and/or understand particular numerical displays because of educational deficiencies or because of impaired vision, to determine readily whether a fever or non-fever condition exists.

In one aspect of the fever thermometer, an adhesive is provided on one side of a flexible backing web for adhering the web to the skin of the human body, the web being provided with a background color. A plurality of numerical display areas are provided on the opposite side of the web, each numerical display area including an encapsulated liquid crystal indicator, the color spectrum of each liquid crystal indicator being responsive to a different specific temperature range, and the liquid crystal indicator being initially of a color to complement the background color so as to be substantially invisible at temperatures below a minimum threshold temperature of the indicator having the lowest temperature range.

A directional indicator is provided on the web for enabling adherence of the web with the numerical display areas in a predetermined attitude when the numerical display areas are substantially invisible at temperatures below the minimum threshold temperature so that the numerical display areas can be easily read when made visible at temperatures within the responsive temperature ranges of the liquid crystal indicators. Those numerical display areas having liquid crystal indicators that indicate a non fever condition are located at the opposite side of the directional indicator. With this structural arrangement, one can ascertain whether or not a fever or non-fever condition exists merely by determining on what side of the directional indicator is the particular visible numerical display area disposed.

In one aspect of the fever thermometer, the directional indicator is an arrow located substantially midway of the web.

In another aspect of the fever thermometer, the directional indicator is of a color contrasting with the background color and visible at all times.

In another aspect of the fever thermometer, a mask overlies the liquid crystal indicators, the mask having substantially the same color as the background color, and the mask being provided with windows disposed over and exposing the liquid crystal indicators to provide the numerical display areas. The directional indicator is provided by a window in the mask having an arrow configuration located substantially midway of the web, and by means providing a color contrasting with the background color and located behind and visible at all times through the directional indicator window.

DESCRIPTION OF THE PREFERRED EMBODIMENT

Figure 2:
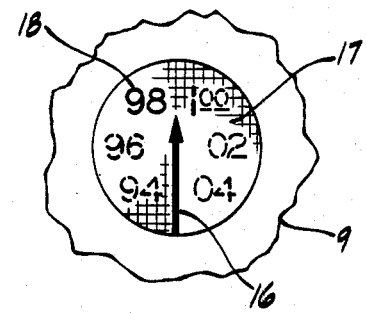
FIG. 2 is a front elevational view of the thermometer attached to a body, and illustrating the arrangement of the directional indicator and associated numerical display areas.

Referring now by characters of reference to the drawings, it will be understood that the fever thermometer includes a clear plastic web 10 provided with an adhesive 11 on one side for adhering the web 10 to the skin of a human body 9(FIG. 2). The adhesive 11 may be any pressure-sensitive adhesive which may be safely applied to the human body 9. Various types of adhesive that may be utilized are fully disclosed in U.S. Pat. Nos. 3,661,142 and 4,030,482. A removable backing strip 12 is applied to the adhesive 11 to protect it, as is conventional. This backing strip 12 may be peeled off prior to applying the thermometer to the body 9.

Figure 3:
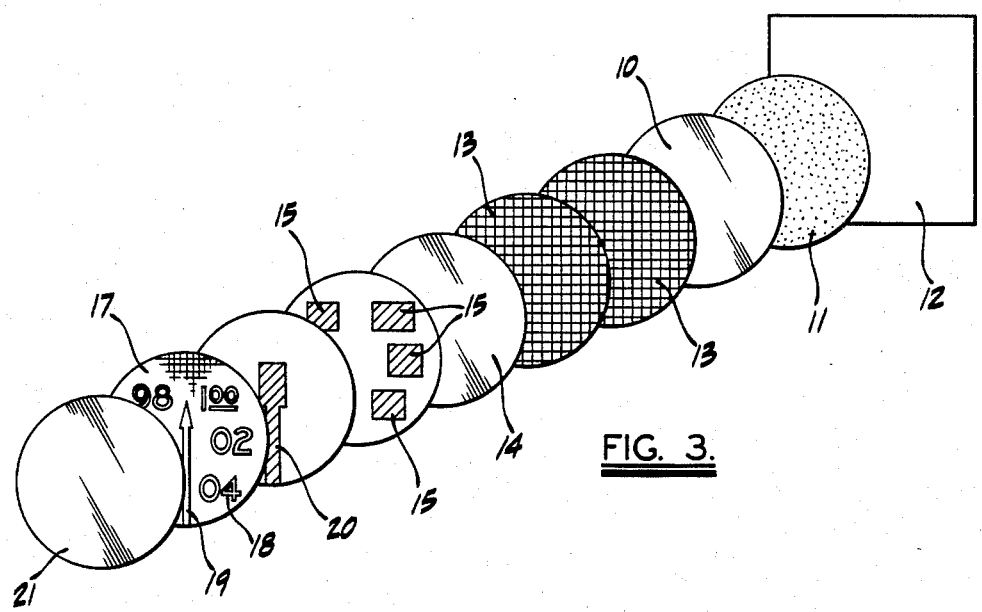
FIG. 3 is an exploded view of the thermometer illustrating the construction.

The flexible backing web 10 is provided with a background color. For example, the other side of the web 10 may be coated with any suitable material such as paint or ink. As shown in FIG. 3, this background color coating is applied in layers 13 of carbon black to provide a flat black color, and is applied as thin as possible so as not to affect heat transfer adversely. The various types of black color coatings that can be utilized to provide the background color are disclosed in U.S. Pat. No. 4,030,482. Also, the plastic web 10 may be of any suitable impregnated color, i.e., to provide a black plastic web.

The background color layers 13 are then covered with a layer 14 of transparent material constituting a color intensifier, the transparent layer 14 being of a water soluable acrylic spray or a clear lacquer.

A plurality of numerical display areas are provided on the opposite side of the web 10, each numerical display area including an ELC (encapsulated liquid crystal) indicator 15 deposited on top of the transparent material layer 14 as by brushing, spraying or by silk screen printing methods. The color spectrum of each ELC indicator 15 is responsive to a different specific temperature range. These ELC formulations are commercially available and are typically an emulsified mixture with particles of the liquid crystal encapsulated in small gelatin capsules nominally having diameters ranging from 2 to 50 microns. The ELC indicators 15 ar initially of a color to complement the background color of the web 10 so as to be substantially invisible at temperatures below the minimum threshold temperature of the ELC indicator 15 having the lowest temperature range. Preferably, the ELC indicators 15 will appear to be black below such minimum threshold temperature to blend in with the black background color provided to the web 10.

The various ELC indicator formulations that can be utilized to indicate various temperature ranges are of the type fully disclosed in U.S. Pat. Nos. 3,661,142 and 4,030,482.

After the ELC indicators 15 are applied, such indicators 15 are then covered with another protective clear translucent material layer of a type similar to the transparent material layer 14 previously described.

Figure 1:
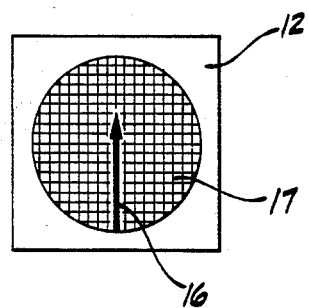
FIG. 1 is a front elevational view of the fever thermometer.

A directional indicator, generally indicated by 16 in FIGS. 1 and 2, is also provided on the backing web 10, the di rectional indicator 16 enabling adherence of the web 10 with the numerical display areas-in a predetermined attitude when the numerical display areas are substantially invisible at temperatures below the minimum threshold temperature of the ELC indicator 15 having the lowest temperature range so that the numerical display areas can be easily read when made visible at temperatures within the responsive temperature ranges of the ELC indicators 15.

A mask 17 having substantially the same color, as for example black, as the background color is disposed over the ELC indicators 15. The mask 17 is provided with windows 18 disposed over and exposing the associated ELC indicators 15 to provide the numerical display areas, the windows 18 forming temperature numerals that are correlated to substantially the mean temperature of the associated ELC indicator 15.

Further, the mask 17 is provided with an elongate window 19 in the configuration of a directional arrow extending substantially transversely of the center of the web 10. A color layer 20 is provided behind and is visible through the directional indicator window 19, the color layer 20 being of a color, as for example white, to contrast with the background color so as to be visible at all times. The directional indicator 16 provided by the directional window 19 and contrasting color layer 20 indicates the attitude at which the thermometer number can be easily read.

It will be understood that the various ELC indicators 15 are arranged substantially about the periphery of the web 10 with the ELC indicator 15 having the lowest temperature range located at the lower left side of the directional indicator 16, and each ELC indicator 15 of successive higher temperature range is located in clockwise spaced relationship about the web periphery. More particularly, it will be understood that the numerical display areas having ELC indicators 15 that indicate a fever condition are located at one side of the directional indicator 16, while those numerical display areas having ELC indicators 15 that indicate a non-fever condition are located at the opposite side of the directional indicator 16. This structural arrangement enables one to determine at a glance whether or not a fever condition exists simply by noting on which side of the directional indicator 16 a particular ELC indicator 15 is visible.

A top layer 21 of the thermometer is provided with a clear plastic sheet that is adhered to the top of the mask 17.

The temperature numbers associated with the ELC indicators 15 are correlated to the body or oral temperature so that rather than indicating the skin or tissue temperature immediately behind the thermometer, the body temperature is indicated. Generally, body temperature correlates with skin temperature at known locations on the body. Accordingly, when the thermometer is applied to a known location, and a particular ELC indicator 15 is visible, the associated temperature number will read out the true body temperature.

To use the fever thermometer, the protective backing strip 12 is peeled from the adhesive 10, and the thermometer is adhesively secured to the skin of the body 9 with the directional indicator 16 pointing in a direction so that the numerical display areas, which have the same general attitude, can be easily read. It will be understood that at normal room or ambient temperature at which the thermometer is applied, the entire front face of the thermometer is substantially the same color as the background color of the backing web 10, i.e., the color black in the preferred embodiment.

Because such ambient or room temperature is below the threshold temperature of the ELC indicator 15 having the lowest temperature range, none of the ELC indicators 15 are visible. However, the directional indicator 16 is visible at all times because it is of a color, i.e., for example the color white in the preferred embodiment, so that the numerical display areas can be placed in a predetermined attitude so that the numerical display areas can be easily read when the ELC indicators 15 are made visible at temperatures within the responsive temperature ranges of the ELC indicators 15. If the directional indicator 16 were not present in this thermometer, the attitude of the numerical display areas would not be readily determined under these conventional ambient temperatures, and the thermometer could be unintentionally adhered to the body in an upside down position or some other attitude in which the numerical display areas could not be easily read.

Moreover, as explained previously, because the ELC indicators 15 that are responsive at temperatures indicating a fever condition, are located at one side of the directional indicator 16, and because the ELC indicators 15 responsive to temperatures indicating a non-fever condition are located at the opposite side of the directional indicator 16, one using this thermometer can easily determine whether or not a fever condition exists merely by noting at which side of the directional indicator 16 a particular ELC indicator 15 is visible. This fever or non-fever condition can he ascertained quickly and easily by anyone even though the particular numerical designation of the temperature cannot be read and/or understood.

I claim as my invention:

1. A fever thermometer comprising:
   (a) a flexible backing web having two opposing sides, the web provided with a background color,
   (b) an adhesive on one side of the web for securing the web to the skin of the human body,
   (c) a plurality of numerical display areas on the opposite side of the web, each numerical display area including an encapsulated liquid crystal indicator, the color spectrum of each liquid crystal indicator being responsive to a different specific temperature range, and the liquid crystal indicators being initially of a color to complement the background color so as to be substantially invisible at temperature below a minimum threshold temperature of the indicator having the lowest temperature range,
   (d) a mask overlying the liquid crystal indicators, the mask being substantially the same color as the background color, and the mask being provided with windows disposed over and exposing the liquid crystal indicators to provide the numerical display areas,
   (e) a directional indicator on the web for enabling adherence of the web with the numerical display areas in a predetermined attitude when the numerical display areas are substantially invisible at temperatures below the minimum threshold temperature so that the numerical display areas can be easily read when made visible at temperatures within the responsive ranges of the liquid crystal indicators, and
   (f) the numerical display areas having liquid crystal indicators that indicate a fever condition being located at one side of the directional indicator, and the numerical display areas having liquid crystal indicators that indicate a non-fever condition being located at the opposite side of the directional indicator.

2. A fever thermometer as defined in claim 1, in which:
   (g) the directional indicator is an arrow configuration located substantially midway of the web.

3. A fever thermometer as defined in claim 1, in which:
   (g) the directional indicator is of a color contrasting with the background color and visible at all times.

* * * * *